(12) United States Patent
Vauchel

(10) Patent No.: US 8,919,693 B2
(45) Date of Patent: Dec. 30, 2014

(54) LOCKABLE GUIDING SYSTEM FOR A MOBILE PART OF A NACELLE

(75) Inventor: Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1433 days.

(21) Appl. No.: 12/531,526

(22) PCT Filed: Mar. 7, 2008

(86) PCT No.: PCT/FR2008/000302
§ 371 (c)(1),
(2), (4) Date: Sep. 16, 2009

(87) PCT Pub. No.: WO2008/132321
PCT Pub. Date: Nov. 6, 2008

(65) Prior Publication Data
US 2010/0031629 A1  Feb. 11, 2010

(30) Foreign Application Priority Data

Mar. 26, 2007 (FR) .................................... 07 02167

(51) Int. Cl.
| | |
|---|---|
| B64D 29/00 | (2006.01) |
| B64D 33/02 | (2006.01) |
| F02C 7/04 | (2006.01) |
| B64D 29/06 | (2006.01) |
| B64D 29/08 | (2006.01) |
| E05F 5/00 | (2006.01) |

(52) U.S. Cl.
CPC . *F02C 7/04* (2013.01); *B64D 29/00* (2013.01); *B64D 29/06* (2013.01); *B64D 29/08* (2013.01); *E05F 5/003* (2013.01); *E05Y 2900/502* (2013.01); *F05D 2240/14* (2013.01); *F05D 2260/52* (2013.01)
USPC .......... 244/53 B; 244/53 R; 244/54; 60/226.1

(58) Field of Classification Search
USPC ........... 244/54, 55, 53 R, 53 B, 62; 60/226.1, 60/796–797; 248/554–557
See application file for complete search history.

(56) References Cited

U.S. PATENT DOCUMENTS 2,579,534 A * 12/1951 Anderson et al. ............. 244/216
3,480,239 A * 11/1969 Jensen et al. .................... 410/79
(Continued)

FOREIGN PATENT DOCUMENTS

| | | |
|---|---|---|
| DE | 20106081 | 6/2001 |
| GB | 2274490 | 7/1994 |

OTHER PUBLICATIONS

International Search Report PCT/FR2008/000302; Dated Sep. 17, 2009.

*Primary Examiner* — Timothy D Collins
*Assistant Examiner* — Steven Hawk
(74) *Attorney, Agent, or Firm* — Brinks Gilson & Lione

(57) ABSTRACT

The invention relates to a guiding device (100) for part of a jet engine nacelle that can move in translation, comprising: (i) a rail (101) fixedly mounted on part of the nacelle, and (ii) a slide (102) which is connected to the mobile part and which can slide along the rail. The invention is characterized in that the guiding device is provided with a built-in retractable system for preventing the translational movement of the slide, for which purpose the device includes: (i) at least one blocking means (104) mounted such that it can move on the rail and occupy alternatively an engaged position in which it forms a translational abutment for the slide and a released position in which it is moved away from the slide and enables the relative translational movement of the slide beyond the locking system, and (ii) at least one means (130) for controlling the blocking means.

11 Claims, 4 Drawing Sheets

(56) References Cited

U.S. PATENT DOCUMENTS

| | | | |
|---|---|---|---|
| 5,609,313 A * | 3/1997 | Cole et al. | 244/54 |
| 6,179,249 B1 * | 1/2001 | Canadas | 244/53 R |
| 6,340,135 B1 * | 1/2002 | Barton | 244/53 B |
| 7,762,057 B2 * | 7/2010 | Sloan et al. | 60/226.1 |
| 8,091,832 B2 * | 1/2012 | Marche | 244/129.5 |
| 8,333,344 B2 * | 12/2012 | Vauchel et al. | 244/53 B |
| 2004/0174104 A1 * | 9/2004 | Chen et al. | 312/334.47 |
| 2006/0033408 A1 * | 2/2006 | Chiu | 312/333 |
| 2008/0277529 A1 * | 11/2008 | Marche | 244/129.4 |
| 2008/0302083 A1 * | 12/2008 | Sloan et al. | 60/226.1 |
| 2010/0252689 A1 * | 10/2010 | Vauchel et al. | 244/53 B |

* cited by examiner

LOCKABLE GUIDING SYSTEM FOR A MOBILE PART OF A NACELLE

TECHNICAL FIELD OF THE INVENTION

The present invention relates to a guide device comprising a rail and a slide which are mounted such that they can move relative to one another and to a turbojet engine nacelle equipped with such a system.

BRIEF DISCUSSION OF RELATED ART

An airplane is propelled by one or more propulsion units comprising a turbojet engine housed in a tubular nacelle. Each propulsion unit is attached to the airplane by a strut generally situated under a wing or at the fuselage.

A nacelle generally has a structure comprising an air inlet upstream of the engine, a central section intended to surround a fan of the turbojet engine, and a downstream section intended to surround the combustion chamber of the turbojet engine and housing thrust reversal means.

The air inlet comprises, on the one hand, an inlet lip designed to allow optimum funneling toward the turbojet engine of the air needed to be fed to the fan and to the internal compressors of the turbojet engine and, on the other hand, a downstream structure to which the lip is attached and which is intended to channel the air suitably toward the fan blades, said downstream structure comprising an external shell ring and an internal acoustic panel. The assembly is attached upstream to a fan casing that forms part of the central section of the nacelle.

The central structure surrounds the fan and is generally broken down into an internal wall that forms said fan casing and an external wall in the form of removable cowls pivotably mounted about a longitudinal axis that forms a hinge at the upper part (in the 12-o'clock position) of the nacelle so as to allow access to the inside of the nacelle.

The way in which these various elements (moving cowls, casing, air inlet lip, external shell ring, acoustic panel) are joined together gives rise to numerous breaks in aerodynamic continuity owing to the presence of offsets and gaps between these elements which are inherent to the fact that they are joined together. What is more, the moving cowls are mounted on hinges, which also give rise to aerodynamic disturbances.

A solution for improving the aerodynamic continuity of the external surface of a nacelle is covered in the as-yet unpublished French patent applications No. 06/08599 and No. 07/01256.

This solution consists in incorporating the air inlet lip into the external shell ring, including therein all or part of the cowl that surrounds the fan casing, so as to form a one-piece structure.

Advantageously, this structure is fitted with translational guidance means of the rail/slide type allowing said cowl easily to be opened and providing access to the inside of the nacelle.

Advantageously too, these guide means may be dismantled so as to allow said structure to be removed and possibly replaced.

It will therefore be appreciated that the rail/guide systems need to be fitted with end-of-translation retaining means (end-of-travel end stops) which nonetheless allow a disengaged position that will allow the rail/slide system to be dismantled.

These end-of-travel end stops for the end of travel of the moving external cowl need to be able to be retracted so that the moving external structure can be replaced, while at the same time returning to an operational state without fail when an external cowl is refitted.

Known ways of achieving this include various end-of-travel spoiler systems for a rail with rolling runners that entail maneuvering the cowl in a special way in order to allow it to be disengaged, or alternatively end stop means.

Nonetheless, these systems do not generally meet the need for ease of access and ease of maneuvering of the end stop means and there is a need for an improved locking system.

BRIEF SUMMARY OF THE INVENTION

The invention alleviates the abovementioned disadvantages and proposes an improved retaining system and for that reason the present invention comprises a guide device for a translationally moving part of a turbojet engine nacelle and comprising, on the one hand, a rail mounted fixedly on a part of the nacelle and, on the other hand, and a slide attached to the moving part and able to slide along the rail, where said guide device is equipped with an in-built retractable system for stopping the translational movement of the slide, and comprising, in order to do this, on the one hand at least one immobilizing means mounted such that it can move on the rail and able to move alternately from an engaged position in which it constitutes a translational end stop for the slide and a disengaged position in which it is away from the slide and allows a relative translational movement of the latter beyond said locking system and, on the other hand, at least one control means for controlling the immobilizing means.

In general, a rail means the male part of the rail/slide system and the term slide denotes the female part.

Thus, by equipping the rail with retractable end stops there is obtained a locking system that is simple to activate, that meets the demanded safety requirements while at the same time allowing the rail and the slide to be dismantled from one another when necessary in order to remove moving parts.

It will also be noted that, in the application in question, it is advantageous to keep the rail fixed, which allows better guidance and better fixing. Further, the fact that the rail is fixed means that the locking and control means can be arranged in a special way.

Advantageously, the immobilizing means is fixed at a first end of the rail. Thus, the immobilizing means is able to form an end-of-travel end stop giving the slide the greatest possible margin for maneuver.

Advantageously too, the control means is mounted at a second end of the rail.

As a preference, the control means is able to be returned from an unlocked position to a locked position during the return of the slide, thereby causing the immobilizing means to return to its engaged position. In this way, reengaging the slide with the rail when the removed panel is returned to its position causes the immobilizing means to be returned automatically to their engaged position. This results in a significant additional safety feature by making it possible to prevent any omission to reactivate the locking system on the part of the operator.

Advantageously, the control means has two stable positions and is mounted against the action of an elastic return means which, when the control means is between two stable positions, tends to return it toward one or other of the positions.

According to a preferred embodiment of the invention, the immobilizing means is in the form of a heel piece mounted such that it can pivot on the rail.

In addition, the guide device comprises a connecting means connecting the control means to the immobilizing means.

As a preference, the rail is hollow and houses all or part of the connecting means.

Advantageously, the immobilizing means is mounted against the action of at least one elastic return means that tends to return it toward its engaged or disengaged position.

Advantageously too, the connecting means is a rod mounted with the capacity for translational movement and able to be moved, under the effect of the control means, alternately between a first position in which it keeps the immobilizing means in its position in which the elastic return means is stressed, and a second position in which the elastic return means is at rest.

The present invention also relates to a nacelle for a turbojet engine comprising an air inlet structure able to channel an air flow toward a fan of the turbojet engine and a central structure intended to surround said fan and to which the air inlet structure is attached, the air inlet structure and possibly the central structure having at least one external panel comprising a one-piece wall, characterized in that the external panel is mounted with the capacity for translational movement with the aid of a guide system according to the invention.

Advantageously, the rail of the guide device is secured to a fixed part of the nacelle while the slide is connected to the moving external panel.

BRIEF DESCRIPTION OF THE DRAWINGS

The way in which the invention is implemented will be better understood from the detailed description which is set out hereinbelow with reference to the attached drawing, in which.

DETAILED DESCRIPTION OF THE INVENTION

Figure 1:
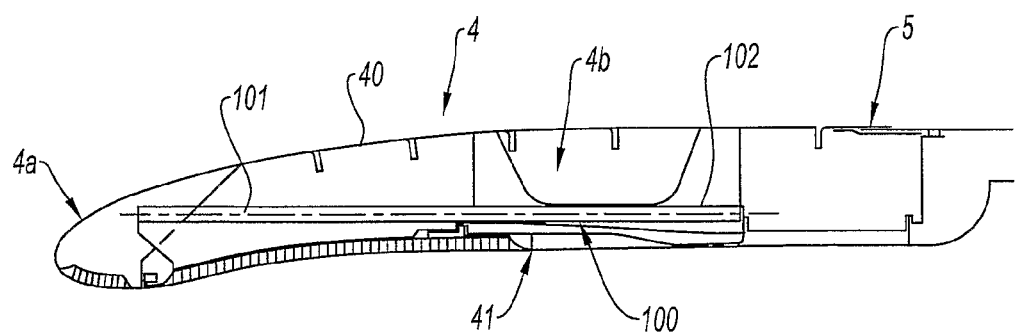
FIGS. 1 and 2 are sectioned partial schematic depictions of an air inlet structure of a turbojet engine nacelle equipped with a guide system according to the invention.

A nacelle (not depicted) constitutes a tubular housing for a turbojet engine and channels the air flows that it generates defining the internal and external aerodynamic lines necessary to obtain optimal performance. It also houses various components necessary for the operation of the turbojet engine, together with ancillary systems such as a thrust reverser.

The nacelle is intended to be attached to a fixed structure of an airplane, such as a wing, via a pylon.

More specifically, a nacelle has a structure comprising a front section that forms an air inlet 4, a central section 5 intended to surround a fan of the turbojet engine, and a rear section (not visible) surrounding the engine of the turbojet engine and generally housing a thrust reversal system.

The air inlet 4 splits into two zones, namely, on the one hand, an inlet lip 4a designed optimally to funnel toward the turbojet engine the air needed to be fed to the fan and to the internal compressors of the turbojet engine and, on the other hand, a downstream structure 4b comprising an external panel 40 and an internal panel 41 and to which the lip 4a is attached and which is intended to channel the air suitably toward the fan blades.

The central section also breaks down into an external wall and an internal wall comprising a casing of the fan.

Figure 2:
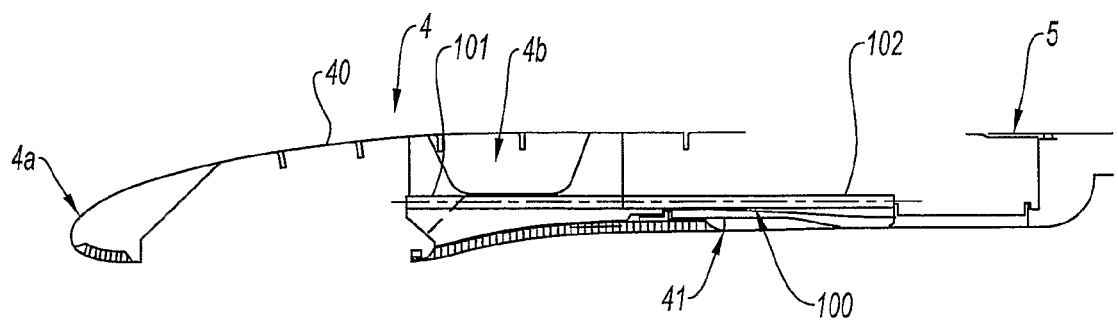

A nacelle that has an air inlet structure as depicted in FIGS. 1 and 2 has a lip 4a incorporated into the external panel 40, it being possible for said external panel also to incorporate, at least in part, the external wall of the central structure 5. The external wall 40 and the air inlet lip 4a therefore form a single dismantlable component extending over the entire upstream part of the nacelle. The internal panel 41 for its part is attached upstream of the fan casing via fixing flanges.

The external panel 40 may be modular and comprise a plurality of longitudinal external panels each defining a portion of the external wall of the nacelle. In such a case, the external structure of the nacelle will have meeting lines running longitudinally with respect to the nacelle, and these will have only a negligible impact on the aerodynamic continuity of the air inlet structure 4, unlike a nacelle according to the prior art that has a peripheral meeting line where the external panel 40 meets the lip 4a and where the external panel 40 meets the external panel of the central section 5, said meeting line running transversely with respect to the direction of the air flow.

As shown in FIGS. 1 and 2, the external panel is mounted with the capacity for translational movement along a substantially longitudinal axis of the nacelle to make it easier to remove and/or to replace.

This translational movement is performed by virtue of the installation of guide means 100 according to the invention, comprising a rail 101 collaborating with a slide 102.

The present invention will be illustrated by a guide system 100 comprising a rail 101 fixedly mounted on the internal wall 41 and a slide 102 fixedly connected to the external panel 40. Quite clearly, the present application is not restricted to such a configuration and it is entirely possible for the invention to be extended to cover a rail fixed to the moving external panel and collaborating with a fixed slide of the nacelle; or alternatively to use a rail with rollers, for example.

As explained, a nacelle as described hereinabove allows simple opening of the entire upstream section of the nacelle but also at the same time allows said external panel 40 to be removed.

As a result, the guide system 100 needs to allow the slide to be halted at the end of its travel when the external panel 40 is simply being opened, but needs also to be able to allow an over-travel of the slide 102 so that it can be disengaged from the rail 101 and the external panel can be removed.

The present invention aims to provide such a guide system 100 which is depicted during the course of various steps in FIGS. 3 to 8.

As previously stipulated, a guide system 100 comprises a rail 101 on which there is mounted a slide 102 capable of translational movement along said rail 101.

The rail 101 is hollow and incorporates a retractable translational immobilization system.

For this, the rail 101 has a first end 103 in which two heel pieces 104 are mounted facing one another.

Each heel piece 104 has a first end 104a forming a pivot and via which it is mounted on an axis of rotation against the wall of the rail 101 and a second end 104b that projects from the first end 103 of the rail 101 forming a return 105 able to project laterally from the rail 101 when the heel piece 104 is pressed against the wall of the rail 101 (engaged position) but not protruding laterally beyond the rail 101 when the heel pieces are sufficiently far away from the wall of the rail 101 (disengaged position).

The heel pieces 104 are connected to one another by a spring 106 that constitutes an elastic return means that tends to return them to their disengaged position. Alternatively, it is equally possible to imagine equipping each heel piece 104 with a spring mounted against the wall of the rail 101 and tending to push them away from said wall.

Each heel piece 104 has, at its end 104b, a beveled face 107 intended to collaborate with a corresponding frustoconical end 121 of a connecting rod 120 mounted with the capacity for translational movement inside the rail 101 and able to move alternately from a first position in which the frustoconical end acts as an end stop for the heel pieces 104 and keeps them in their engaged position against the action of the spring 106, to a second position in which the frustoconical end 121 is away from the heel pieces 104 and allows them, under the effect of the spring 106, to return toward their disengaged position.

The rod 120 is made to move between its two positions by means of a trigger 130 positioned at a second end 108 of the rail 101.

The trigger 130 is mounted such that it can rotate between two stable positions and is connected to the rod 120 by a link 131.

The trigger 130 is also connected to an elastic return means 132 allowing it to be kept in each of the two stable positions and to be returned to one of its two positions when it is in an unstable intermediate position.

The two stable positions of the trigger 130 are determined in such a way that, on the one hand, when actuated into its first stable position, the trigger 130, via the link 132, drives the rod 120 into its position of separation from the heel pieces 104 which then move into the disengaged position and, on the other hand, when actuated into its second stable position, the trigger 130 via the link 132 returns the rod 120 to its position of engagement with the heel pieces 104 which, as explained hereinabove, are then kept in their engaged position.

It will also be noted that the trigger is equipped with an extension 133 arranged in such a way that it projects laterally from the rail 101 when the heel pieces 104 are in the disengaged position.

The various steps in implementing the guide system 100 and its in-built locking system will now be explained with the aid of FIGS. 3 to 8.

Figure 3:
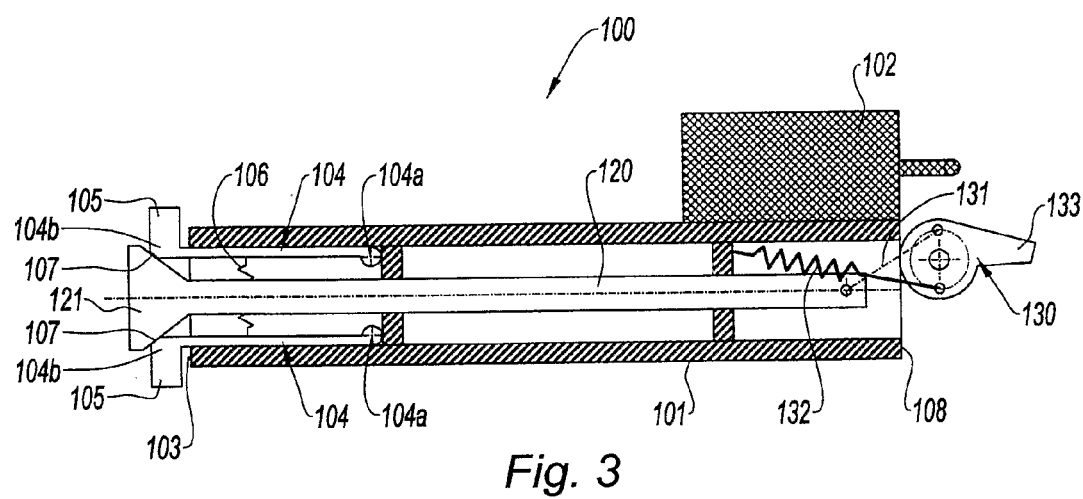
FIG. 3 is a schematic depiction of the guide system according to the invention, in the position in which the external cowl is locked and closed.

FIG. 3 illustrates the guide system 100 in its initial position when the external panel 40 is closed and the heel pieces 104 are in their engaged position.

In this position, the slide 102 is retreated toward the second end 108 of the rail 101. As for the in-built immobilizing system, the heel pieces 104 are kept in the engaged position, that is to say in the position in which they project laterally from the rail 101, by the end 121 of the rod 120. The trigger 130 is in the corresponding stable position.

Figure 4:
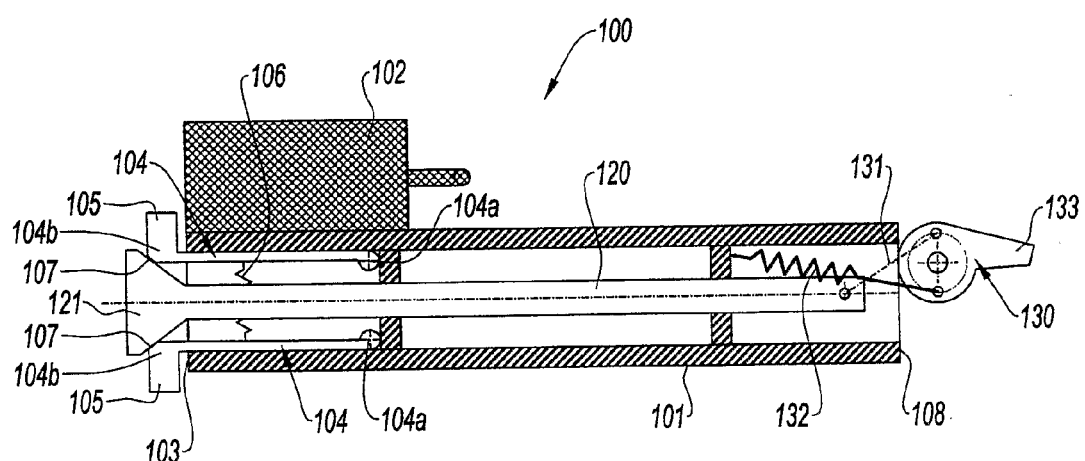
FIG. 4 is a schematic depiction of the guide system according to the invention, in the position in which the external cowl is locked and open.
Figure 5:
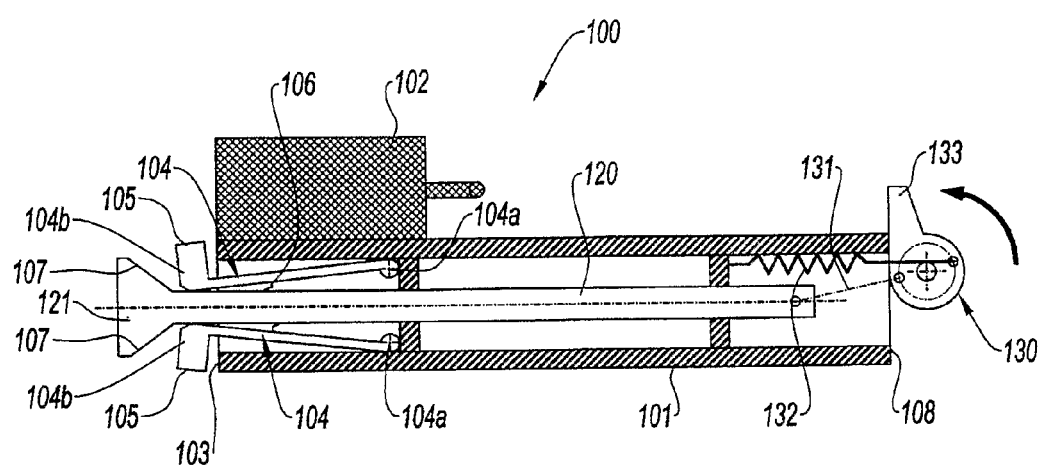
FIG. 5 is a schematic depiction of the guide system according to the invention, in the position in which the external cowl is unlocked and open.

FIG. 4 illustrates the guide system 101 in the case of simple opening of the external panel 40 without its removal. In this configuration, the heel pieces 104 are still in the engaged position and the slide 102 has slid toward the first end 103 of the rail 101 until possibly it has come into abutment against the return 105 of the heel pieces 104.

FIGS. 5 to 8 illustrate the steps involved in completely removing and possibly replacing the external panel 40.

To do this, the trigger 130 is pivoted by hand or through an electric control into its second stable position.

It will be noted that the locking means are located at one end of the rail while the control means are located at the second end. This is because such positioning is advantageous because it allows ease of access to the control means, the moving cowl 40 beginning to open from the side at which the control means are located.

As this happens, the link 132 transmits this movement to the rod 120 which undergoes a slight translational movement until the frustoconical end 121 has moved away from the heel pieces 104 to allow them, under the effect of the spring 106, to return to their disengaged position.

Figure 6:
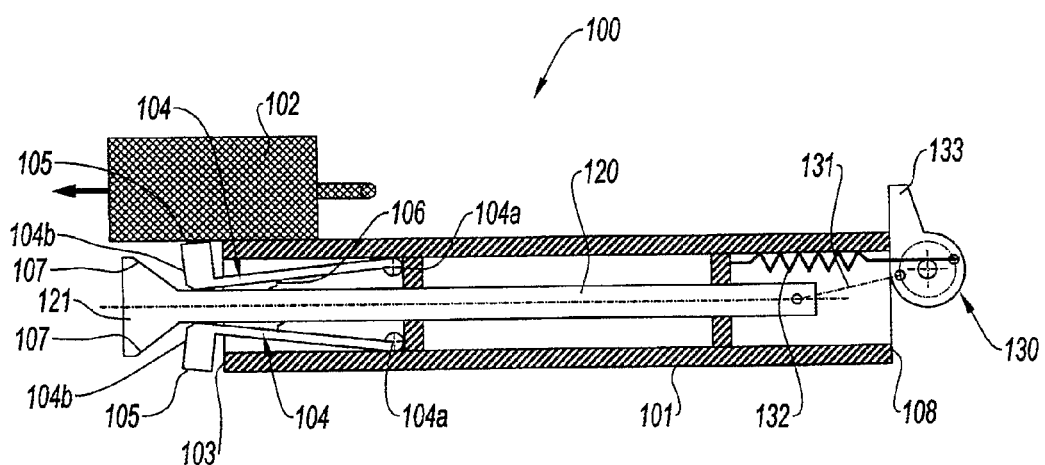
FIG. 6 is a schematic depiction of the guide system according to FIG. 5 and in which the external cowl is in the process of being removed.

Thus, the returns 105 of the heel pieces 104 no longer project laterally from the rail 101 and the slide 102 is free to continue its travel as illustrated in FIG. 6 so that the rail 101 and the slide 102 can be disengaged, allowing the external panel 40 to be removed.

Figure 7:
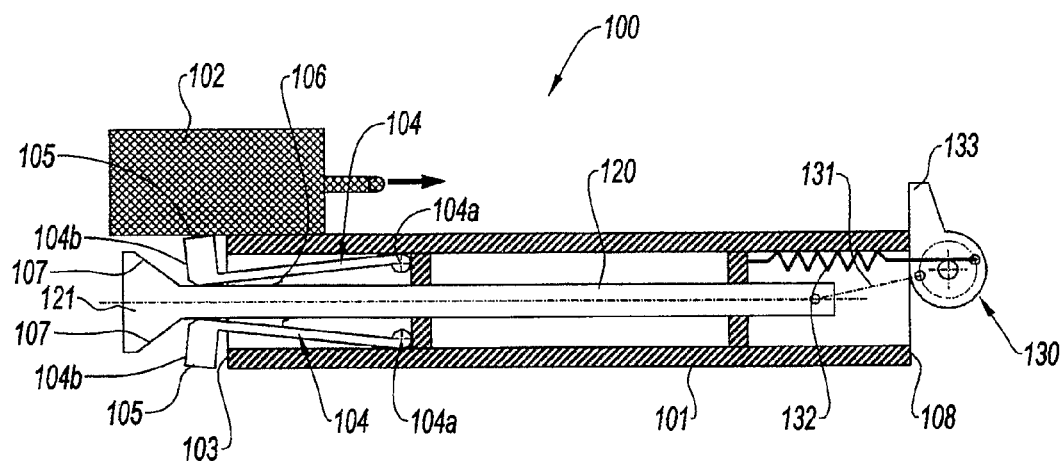
FIG. 7 is a schematic depiction of the guide system according to FIG. 5 and in which the external cowl is in the process of being refitted.

As illustrated in FIG. 7, the external panel 40 or a new panel is refitted by performing the procedure in reverse.

Figure 8:
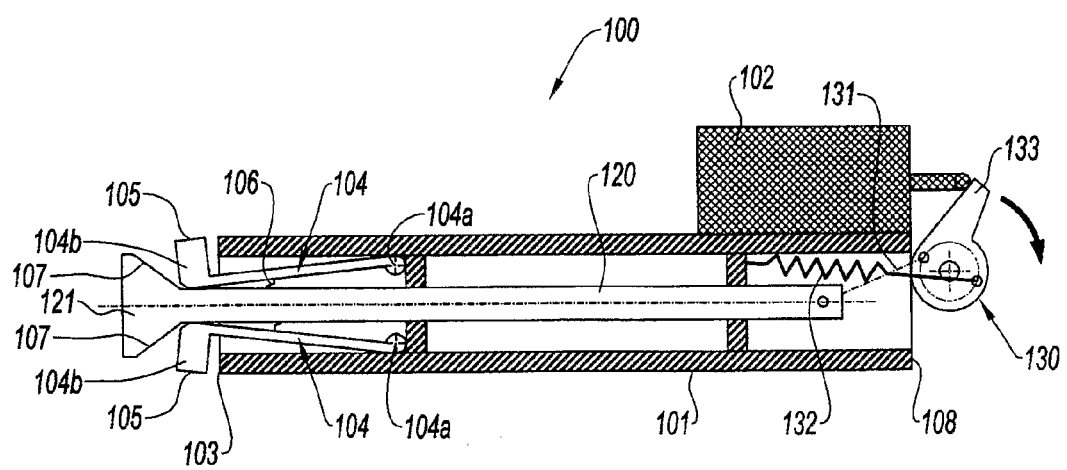
FIG. 8 is a schematic depiction of the guide system at the end of the refitting of the external cowl with the locking means returned to the engaged position.

However, as is depicted in FIG. 8, the locking system is able automatically to return to the engaged position once the external panel 40 has been refitted.

What happens is that when the external panel 40 is returned to the closed position, the slide 102 undergoes a translational movement along the rail 101 toward its second end 108 where the extension 133 of the trigger projects laterally from the wall of the rail 101.

As the external panel 40 is returned to the closed position, the slide butts against said extension 133 of the trigger and pushes it back, thus causing the trigger 130 to return to its first stable position and, as a result, causing the heel pieces 104 to reengage.

The external panel 40 is manipulated in the conventional way using suitable tooling mounted on lifting points, advantageously situated near the center of gravity of the wall. Hence it is easy to perform a pivoting by hand in order to fit and remove said one-piece wall. Optionally, the lifting point may be situated inside a casing of a latch.

Although the invention has been described in conjunction with specific exemplary embodiments, it is quite obvious that it is not in any way restricted thereto and that it comprises all technical equivalents of the means described and combinations thereof where these fall within the scope of the invention.

In particular, it would be possible to provide retractable end stops of different shapes. It will also be noted that the present guide system is not limited to an air inlet external panel but could also be applied to the guidance of any moving part of a nacelle.

It will finally be noted that the locking system according to the invention may be combined with an electric drive and control system, possibly associated with a sensor to detect that the external panel has been re-closed.

The invention claimed is:

1. A guide device for a translationally moving part of a turbojet engine nacelle and comprising:
    a rail mounted fixedly on a part of the nacelle; and
    a slide attached to the moving part and able to slide along the rail,
    wherein said guide device is equipped with an in-built retractable system for stopping a translational movement of the slide and said guide device comprising at least one immobilizing means pivotally mounted on the rail such that the immobilizing means move alternately from an engaged position in which the immobilizing means constitutes a translational end stop for the slide to a disengaged position in which the immobilizing means is away from the slide and allows a relative translational movement of the slide beyond a locking system and, the retractable system further comprising at least one control means for controlling the immobilizing means, wherein the control means is returned from an unlocked position to a locked position upon a return of the slide, thereby causing the immobilizing means to return to the engaged position.

2. The guide device as claimed in claim 1, wherein the immobilizing means is fixed at a first end of the rail.

3. The guide device as claimed in claim 1, wherein the control means is mounted at a second end of the rail.

4. The guide device as claimed in claim 1, wherein the control means has two stable positions and is mounted against an elastic return means which, when the control means is between two stable positions, enforces the control means to return toward one or other of the stable positions.

5. The guide device as claimed in claim 1, wherein the immobilizing means is in the form of a heel piece mounted such that the heel piece can pivot on the rail.

6. The guide device as claimed in claim 5, further comprising a connecting means connecting the control means to the immobilizing means.

7. The guide device as claimed in claim 6, wherein the rail is hollow and houses all or part of the connecting means.

8. The guide device as claimed in claim 1, wherein the immobilizing means is mounted against at least one elastic return means that is able to return the immobilizing means toward the engaged or disengaged position.

9. The guide device as claimed in claim 8, wherein the connecting means is a rod mounted with a capacity for translational movement and able to be moved by the control means, alternately between a first position in which it keeps the immobilizing means in a position in which the elastic return means is stressed, and a second position in which the elastic return means is at rest.

10. A nacelle for a turbojet engine comprising an air inlet structure able to channel an air flow toward a fan of the turbojet engine and a central structure intended to surround said fan and to which the air inlet structure is attached, the air inlet structure having at least one external panel comprising a one-piece wall, wherein the external panel is mounted with the capacity for translational movement with aid of a guide system as claimed in claim 1.

11. A nacelle for a turbojet engine comprising an air inlet structure able to channel an air flow toward a fan of the turbojet engine and a central structure intended to surround said fan and to which the air inlet structure is attached, the central structure having at least one external panel comprising a one-piece wall, wherein the external panel is mounted with the capacity for translational movement with aid of a guide system as claimed in claim 1.

\* \* \* \* \*